(12) United States Patent
Bammanahalli et al.

(10) Patent No.: US 12,436,516 B2
(45) Date of Patent: Oct. 7, 2025

(54) FABRICATION TOOL CALIBRATION

(71) Applicant: Applied Materials, Inc., Santa Clara, CA (US)

(72) Inventors: Gautham Bammanahalli, Newark, CA (US); Nathaniel Moore, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 393 days.

(21) Appl. No.: 18/181,491

(22) Filed: Mar. 9, 2023

(65) Prior Publication Data

US 2024/0302812 A1    Sep. 12, 2024

(51) Int. Cl.
*G05B 19/401* (2006.01)
*G05B 13/04* (2006.01)

(52) U.S. Cl.
CPC ......... *G05B 19/401* (2013.01); *G05B 13/048* (2013.01)

(58) Field of Classification Search
CPC ............................. G05B 13/048; G05B 19/401
USPC ......................................................... 700/121
See application file for complete search history.

(56) References Cited

U.S. PATENT DOCUMENTS

| | | |
|---|---|---|
| 10,892,147 B2 | 1/2021 | Tallavarjula et al. |
| 10,916,411 B2 | 2/2021 | Shinagawa |
| 11,280,686 B2 | 3/2022 | Howells et al. |
| 2004/0215365 A1 | 10/2004 | Obara et al. |
| 2005/0118812 A1 | 6/2005 | Donohue et al. |
| 2009/0101173 A1* | 4/2009 | Peng .................. H01L 21/67034 134/57 R |
| 2013/0119016 A1* | 5/2013 | Kagoshima ........ G05B 19/4184 156/345.24 |
| 2018/0130647 A1 | 5/2018 | Tallavarjula et al. |

(Continued)

FOREIGN PATENT DOCUMENTS

| | | | |
|---|---|---|---|
| JP | 2003-067005 | 3/2003 | |
| JP | 2003067005 A * | 3/2003 | ............. C23C 16/52 |

(Continued)

OTHER PUBLICATIONS

International Search Report and Written in International Appln. No. PCT/US2024/012191, mailed on May 13, 2024, 8 pages.

(Continued)

*Primary Examiner* — Ronald D Hartman, Jr.
(74) *Attorney, Agent, or Firm* — Fish & Richardson P.C.

(57) ABSTRACT

A method for calibrating a fabrication system including selecting, from multiple recipes, a calibration recipe including a first process parameter for performing a fabrication process on a substrate, including: for each recipe and for two or more substrates, characterization data representative of the fabrication process performed on the two or more substrates using the recipe is received. A second process parameter is determined from the first and second states of the substrates, and a process relationship is determined between the first process parameter and the second process parameter for the recipe. The calibration recipe is selected from the multiple recipes based on the respective process relationships, a threshold variation for the process relationship is determined between the first and the second process parameter; and the calibration recipe and the threshold variation are provided for calibrating the fabrication system.

13 Claims, 6 Drawing Sheets

(56) References Cited

U.S. PATENT DOCUMENTS

2020/0124968 A1* 4/2020 Tel .................. G03F 7/70616
2022/0066411 A1  3/2022 Ummethala et al.

FOREIGN PATENT DOCUMENTS

| JP | 2005-514788 | | 5/2005 | |
|---|---|---|---|---|
| JP | 2005514788 A | * | 5/2005 | ......... H01L 21/3065 |
| WO | WO-2020205339 A1 | * | 10/2020 | ............ C23C 14/54 |
| WO | WO-2022061179 A1 | * | 3/2022 | ....... G05B 19/41865 |

OTHER PUBLICATIONS

Office Action in Taiwanese Appln. No. 113102186, dated Nov. 29, 2024, 5 pages (with English search report).

* cited by examiner

FABRICATION TOOL CALIBRATION

TECHNICAL FIELD

This specification relates to semiconductor systems, processes, and equipment.

BACKGROUND

Plasma etching can be used in semiconductor processing to fabricate integrated circuits. Integrated circuits can be formed from layer structures including multiple (e.g., two or more) layer compositions. Different etching gas chemistries, e.g., different mixtures of gases, can be used to form a plasma in the processing environment such that a given etching gas chemistry can have increased precision and higher selectivity for a layer composition to be etched. As scaling of integrated circuits continues to move towards smaller features and increased aspect ratios, there is a growing need for precision etching of layer structures.

SUMMARY

This specification describes technologies for fabrication tool calibration.

These technologies generally involve methods for reducing variability between different fabrication tools and/or different processing chambers of a same fabrication tool. Variability is reduced by using optimized and well-characterized process parameter sensitized recipes to determine chamber variability for a fabrication process performed by a fabrication tool. The determined chamber variability is used to generate offset parameters to align the fabrication tool with a standardized fabrication tool.

In general, one innovative aspect of the subject matter described in this specification can be embodied in methods for temperature calibration of fabrication tools for semiconductor processing, including selecting by a system and from multiple recipes, a calibration recipe including a first process parameter for performing a fabrication process on a substrate. The selecting includes, for each recipe of the multiple recipes: receiving, by the system and for two or more substrates, characterization data representative of the fabrication process performed on the two or more substrates using the recipe, where the fabrication process for each substrate of the two or more substrates includes a different value for the first process parameter, and where the characterization data representative of the fabrication process on each substrate of the two or more substrates comprises a first state of the substrate prior to the fabrication process and a second state of the substrate after the fabrication process. The system determines, from the first and second states of the substrates, a second process parameter, and determines, for the fabrication processes performed on the two or more substrates using the recipe, a process relationship between the first process parameter and the second process parameter for the recipe. The system selects the calibration recipe from the multiple recipes based on the respective process relationships for the multiple recipes. The system determines, for the calibration recipe, a threshold variation for the process relationship between the first process parameter and the second process parameter and provides the calibration recipe and the threshold variation for calibrating the fabrication system.

Other embodiments of this aspect include corresponding systems, computer systems, apparatus, and computer programs recorded on one or more computer storage devices, each configured to perform the actions of the methods.

As used in this specification, a substrate refers to a wafer or another carrier structure, e.g., a glass plate. A wafer can include a semiconductor material, e.g., Silicon, GaAs, InP, or another semiconductor-based wafer material. A wafer can include an insulator material, for example, silicon-on-insulator (SOI), diamond, etc. At times, the substrate includes film(s) formed on a surface of the wafer/carrier structure. The film(s) can be, for example, dielectric, conductive, or insulating films. The film(s) can be formed on the surface of the wafer using various deposition techniques, for example, spin-coating, atomic layer deposition (ALD), chemical vapor deposition (CVD), metal-organic chemical vapor deposition (MOCVD), molecular beam epitaxy (MBE), or other similar techniques for forming thin film layers on a wafer or another carrier structure. In some embodiments, the fabrications tools described in this specification are plasma-based etching tools, where etch processes can be performed on the formed layers on the surface of the wafer/carrier structure and/or on the wafer.

The subject matter described in this specification can be implemented in these and other embodiments so as to realize one or more of the following advantages. Implementing a calibration process to reduce chamber-to-chamber variability between fabrication tools can result in improved yield and increased fidelity of fabricated devices using a same fabrication process between two or more fabrication tools. A variability of critical dimensions (CD), (e.g., a specific dimension that an end user uses to benchmark a fidelity and/or yield of the etch process), between fabricated structures etched by different deployed fabrication tools can be reduced using the calibration methods described in this specification. A variability of etch rates under nominally identical conditions between different deployed fabrication tools can be reduced using the calibration methods described in this specification. Reducing variability, e.g., temperature variability, between different fabrications tools can improve a consistency between different fabrication tools performing a same fabrication process (e.g., using a same recipe).

In particular, the calibration methods can be used to measure and calibrate low-temperature etch processes performed on plasma-based etch tools, where a substrate temperature during the fabrication process is maintained between about −150 to −20 degrees Celsius, e.g., between about −90 to −20 degrees Celsius, between about −150 to −90 degrees Celsius. Limitations of conventional temperature sensors to operate in and/or have accuracy in the low-temperature regime can limit the ability to perform temperature control during the low-temperature etch processes. Moreover, etch processes can have increased sensitivity to temperature fluctuations in the low-temperature regime, resulting in higher variation of etch rate and lower fidelity of resulting fabrication processes. The calibration process can be used to determine an offset of the fabrication tool from a set standardized tool and provide a global (or local) offset to the feedback control of the fabrication tool to align the performance of the fabrication tool with the set standardized tool. In this way, a variability between fabrication tools performing low-temperature fabrication processes (e.g., low temperature etch processes) can be reduced to less than about 1.5 degrees C. Reduced variability between fabrication tools can result in reduced variability, greater utilization of a fleet of systems in the field, as well as improved yield and fidelity of processes performed by different fabrication tools. Although the remaining disclosure will identify specific calibration processes for etch-based fabrication tools using the disclosed technology, it will be readily understood that the systems and methods are equally applicable to a variety of other fabrication tools and chambers. Accordingly, the technology should not be considered to be so limited as for use with the described etching fabrication tools alone. The disclosure will discuss one possible system and chamber that can be used with the present technology before describing systems and methods or operations of exemplary process sequences according to some embodiments of the present technology. It is to be understood that the technology is not limited to the equipment described, and processes discussed can be performed in any number of processing chambers and systems.

BRIEF DESCRIPTION OF THE DRAWINGS

Like reference numbers and designations in the various drawings indicate like elements.

DETAILED DESCRIPTION

The present specification provides improved methods and assemblies for fabrication tool calibration. Embodiments of the present disclosure include methods for reducing variability between different fabrication tools and/or between different processing chambers of a same fabrication tool. Variability is reduced by using optimized and well-characterized process parameter sensitized recipes to determine chamber variability for a fabrication process performed by a fabrication tool. The determined chamber variability is used to generate offset parameters to align the fabrication tool with a standardized fabrication tool.

Figure 1:
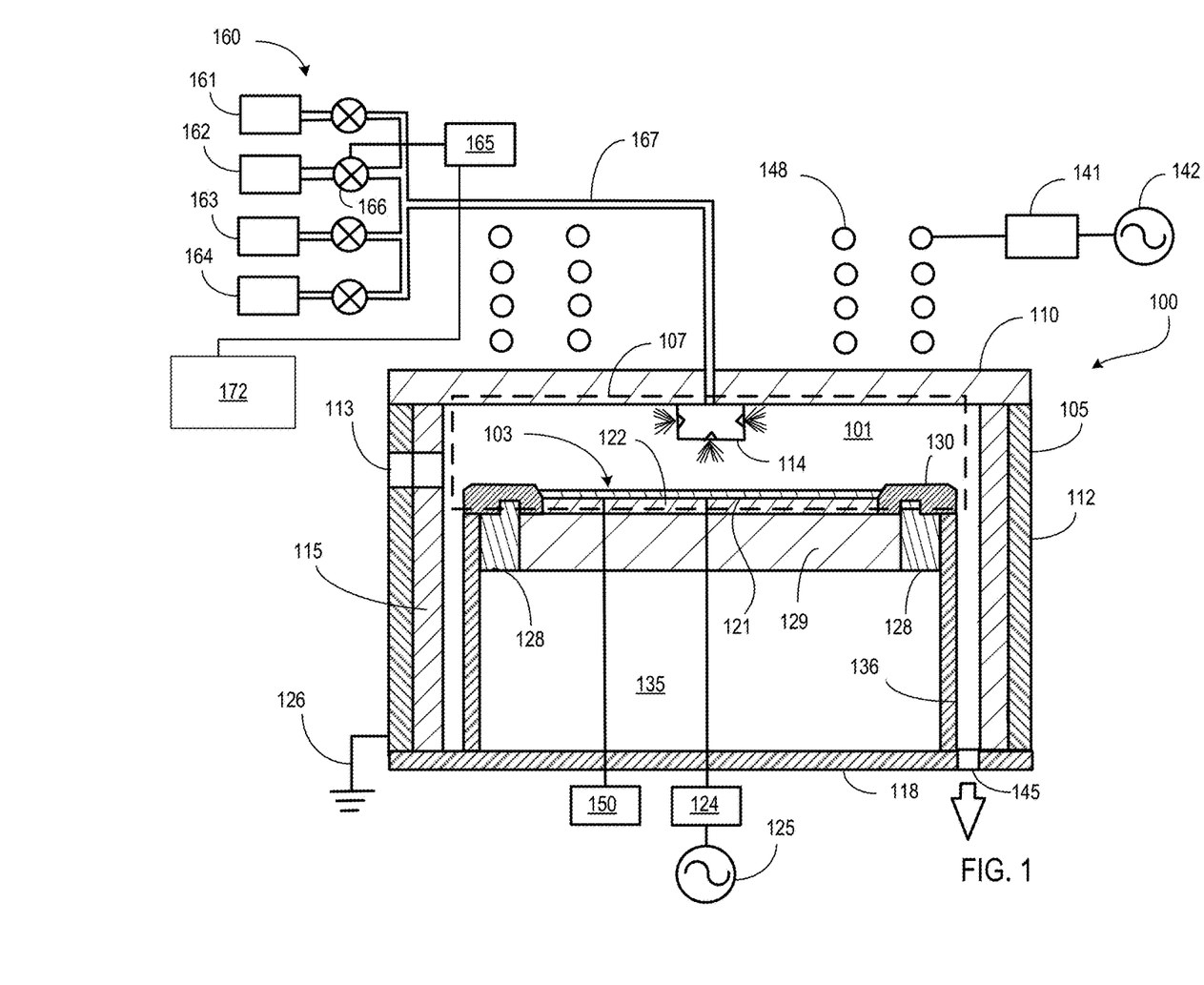
FIG. 1 shows a schematic cross-sectional view of an example plasma processing chamber.

FIG. 1 illustrates a schematic cross-sectional view of an example processing chamber 100 suitable for etching one or more material layer(s) disposed on a substrate 103 (e.g., also referred to as a "wafer") in the processing chamber 100, e.g., a plasma processing chamber. The processing chamber 100 includes a chamber body 105 defining a chamber volume 101 in which a substrate can be processed. The chamber body 105 has sidewalls 112 and a bottom 118 which are coupled with ground 126. The sidewalls 112 can include a liner 115 to protect the sidewalls 112 and extend the time between maintenance cycles of the plasma processing chamber 100. The chamber body 105 is supportive of a chamber lid assembly 110 to enclose the chamber volume 101. The chamber body 105 can be fabricated from, for example, aluminum or other suitable materials. A substrate access port 113 is formed through the sidewall 112 of the chamber body 105, which can facilitate the transfer of the substrate 103 into and out of the plasma processing chamber 100. Access port 113 can be coupled with a transfer chamber and/or other chambers (not shown) of a substrate processing system, e.g., to perform other processes on the substrate. A pumping port 145 is formed through the bottom 118 of the chamber body 105 and connected to the chamber volume 101. A pumping device can be coupled through the pumping port 145 to the chamber volume 101 to evacuate and control the pressure within the processing volume. The pumping device can include one or more pumps and throttle valves.

Chamber volume 101 includes a processing region 107, e.g., a station for processing a substrate. A substrate support 135 can be disposed in the processing region 107 of chamber volume 101 to support the substrate 103 during processing. The substrate support 135 can include an electrostatic chuck 122 for holding the substrate 103 during processing. The electrostatic chuck ("ESC") 122 can use the electrostatic attraction to hold the substrate 103 to the substrate support 135. The ESC 122 can be powered by an RF power supply 125 integrated with a match circuit 124. The ESC 122 can include an electrode 121 embedded within a dielectric body. The electrode 121 can be coupled with the RF power supply 125 and can provide a bias which attracts plasma ions, formed from the process gases in the chamber volume 101, to the ESC 122 and substrate 103 seated on the pedestal. The RF power supply 125 can cycle on and off, or pulse, during processing of the substrate 103. The ESC 122 can have an isolator 128 for the purpose of making the sidewall of the ESC 122 less attractive to the plasma to prolong the maintenance life cycle of the ESC 122. Additionally, the substrate support 135 can have a cathode liner 136 to protect the sidewalls of the substrate support 135 from the plasma gases and to extend the time between maintenance of the plasma processing chamber 100. Alternatively, in some embodiments, the ESC 122 can be powered by an applied pulsed DC voltage applied to the substrate rather than by an RF power supply 125.

Electrode 121 can be coupled with a DC power source 150. The power source 150 can provide a chucking voltage of about 200 volts to about 2000 volts to the electrode 121. The power source 150 can also include a system controller for controlling the operation of the electrode 121 by directing a DC current to the electrode 121 for chucking and de-chucking the substrate 103. The ESC 122 can include heaters disposed within the and connected to a power source for heating the substrate, while a cooling base 129 supporting the ESC 122 can include conduits for circulating a heat transfer fluid to maintain a temperature of the ESC 122 and substrate 103 disposed thereon. The ESC 122 can be configured to perform in the temperature range required by the thermal budget of the device being fabricated on the substrate 103. For example, the ESC 122 can be configured to maintain the substrate 103 at a temperature of about −150° C. or lower to about 500° C. or higher depending on the process being performed. A cover ring 130 can be disposed on the ESC 122 and along the periphery of the substrate support 135. The cover ring 130 can be configured to confine etching gases to a desired portion of the exposed top surface of the substrate 103, while shielding the top surface of the substrate support 135 from the plasma environment inside the plasma processing chamber 100.

A gas panel 160 (e.g., also referred to herein as "gas distribution manifold") can be coupled by a gas line 167 with the chamber body 105 through chamber lid assembly 110 to supply process gases into the chamber volume 101. The gas panel 160 can include one or more process gas sources 161, 162, 163, 164 and can additionally include inert gases, non-reactive gases, and reactive gases, as can be used for any number of suitable processes. Examples of process gases that can be provided by the gas panel 160 include, but are not limited to, hydrocarbon containing gases including methane, sulfur hexafluoride, silicon chloride, silicon tetrachloride, carbon tetrafluoride, hydrogen bromide. Process gases that can be provided by the gas panel can include, but are limited to, argon gas, chlorine gas, nitrogen, helium, or oxygen gas, sulfur dioxide, as well as any number of additional materials. Additionally, process gasses can include nitrogen, chlorine, fluorine, oxygen, or hydrogen containing gases including, for example, $BCl_3$, $C_2F_4$, $C_4F_8$, $C_4F_6$, $CHF_3$, $CH_2F_2$, $CH_3F$, $NF_3$, $NH_3$, $CO_2$, $SO_2$, $CO$, $N_2$, $NO_2$, $N_2O$, and $H_2$, among any number of additional suitable precursors. Process gases from process gas sources, e.g., sources 161, 162, 163, 164, can be combined to form one or more etching gas mixtures. For example, gas panel 160 includes one or more process gas sources specific to oxide-based etching chemistries. In another example, gas panel 160 includes one or more process gas sources specific to nitride-based etching chemistries.

Gas panel 160 includes various valves, pressure regulators (not shown), and mass flow controllers (not shown) arranged with respect to the gas sources 161, 162, 163, 164 to control the flow of the process gases from the sources. Valves 166 can control the flow of the process gases from the sources 161, 162, 163, 164 from the gas panel 160. Operations of the valves, pressure regulators, and/or mass flow controllers can be controlled by a controller 165. Controller 165 can be operably coupled to an electro-valve (EV) manifold (not shown) to control actuation of one or more of the valves, pressure regulators, and/or mass flow controllers. The lid assembly 110 can include a gas delivery nozzle 114. The gas delivery nozzle 114 can include one or more openings for introducing the process gases from the sources 161, 162, 163, 164 of the gas panel 160 into the chamber volume 101. After the process gases are introduced into the plasma processing chamber 100, the gases can be energized to form a plasma. An antenna 148, such as one or more inductor coils, can be provided adjacent to the plasma processing chamber 100. An antenna power supply 142 can power the antenna 148 through a match circuit 141 to inductively couple energy, such as RF energy, to the process gas to maintain a plasma formed from the process gas in the chamber volume 101 of the plasma processing chamber 100. Alternatively, or in addition to the antenna power supply 142, process electrodes below the substrate 103 and/or above the substrate 103 can be used to capacitively couple RF power to the process gases to maintain the plasma within the chamber volume 101. The operation of the power supply 142 can be controlled by a controller, such as controller 165, that also controls the operation of other components in the plasma processing chamber 100.

The controller 165 can be used to control the process sequence, regulating the gas flows from the gas panel 160 into the plasma processing chamber 100, and other process parameters. Software routines, when executed by a computing device having one or more processors (e.g., a central processing unit (CPU)) in data communication with one or more memory storage devices, transform the computing device into a specific purpose computer such as a controller, which can control the plasma processing chamber 100 such that the processes are performed in accordance with the present disclosure. The software routines can also be stored and/or executed by one or more other controller(s) that can be associated with the plasma processing chamber 100.

In some embodiments, controller 165 is in data communication with a characterization device 172. Characterization device 172 can include one or more sensors (e.g., image sensors) operable to collect processing data related to processing chamber 100. For example, characterization device 172 includes an optical emission spectroscopy device configured to monitor a signal, e.g., emitted light of a plasma, within a processing region of the processing chamber 100. For example, a signal can be a primary or highest intensity wavelength of emitted light. Characteristics of the emitted light (e.g., wavelength and intensity) from the plasma within the processing region can depend in part on an etching gas mixture used to generate the plasma as well as a layer composition of the layer being etched. For example, each etching gas mixture and corresponding layer composition being etched can have a respective signal signature. Emitted wavelengths that are unique or distinguishing for each etching gas mixture and corresponding layer composition can be monitored to determine an etching condition of the layer being etched. For example, a thickness remaining of the layer being etched. Characteristics of the emitted light from the plasma can change, e.g., based on the etching process. For example, an intensity of a monitored signal can change as material is removed from the layer being processed. Characterization device 172 can be configured to collect processing data including the respective signals corresponding to the etching gas mixtures utilized in the substrate processing and corresponding layer compositions of the structure being processed in the processing chamber 100. Controller 165 can receive processing data from the characterization device 172 and determine, from the processing data, one or more actions to perform.

In some embodiments, at a termination point of etching process(es) for the substrate, an automatic or semi-automatic robotic manipulator (not shown) can be utilized to transfer the substrate(s) from the substrate support out of the processing chamber, e.g., through substrate access port 113. For example, the robotic manipulator can transfer the substrate to another chamber (or another location) to perform another step in a fabrication process.

In some embodiments, the substrate can be transferred to a metrology chamber, e.g., another chamber including one or more metrology tool(s). The metrology chamber can be coupled to the processing chamber, e.g., through a substrate access port 113. The metrology chamber can be an external metrology chamber where the substrate is removed from the processing chamber and provided to the external metrology chamber. Metrology chamber can be configured to characterize the substrate before, during, and/or after a fabrication process performed in the processing chamber. At times, the metrology chamber can be configured to characterize the substrate between fabrication processes. As described in more detail with reference to FIG. 2, the metrology chamber can be configured to characterize an etch process performed on the substrate, for example, by characterizing thin films formed on the surface of the substrate before and after an etch process in the processing chamber.

As used in this specification, the processing chamber 100 is a component of a fabrication tool, e.g., a plasma etch tool. At times, a fabrication tool can include two or more processing chambers 100 each configured as described with reference to FIG. 1. The fabrication tool can include one or more additional auxiliary chambers, e.g., a load lock, a metrology chamber, a substrate cleaning/preparation chamber, a transfer chamber, etc. Where described here as a fabrication process performed by a fabrication tool, it can be understood that the fabrication process may be performed within a processing chamber, e.g., processing chamber 100 of FIG. 1.

At times, a fabrication process performed by a fabrication tool using a recipe may result in a different outcome than a fabrication process performed by a different fabrication tool using the same recipe. For example, variations in installed hardware, age/wear of hardware, variations in calibrations/offsets of sensors, variations in calibrations/offsets of the fabrication tool, or other variations between fabrication tools, can all contribute to a chamber-to-chamber variability in performing fabrication processes using a same recipe. Moreover, certain operating regimes may have increased sensitivity to one or more process parameters of a recipe, such that variability of outcome for the recipe may be increased between chambers. To reduce a chamber-to-chamber variability, a calibration procedure can be developed using a standardized (e.g., "gold standard") fabrication tool and can be used to reduce variability of other fabrication tools with respect to the standardized tool and each other.

Figure 2:
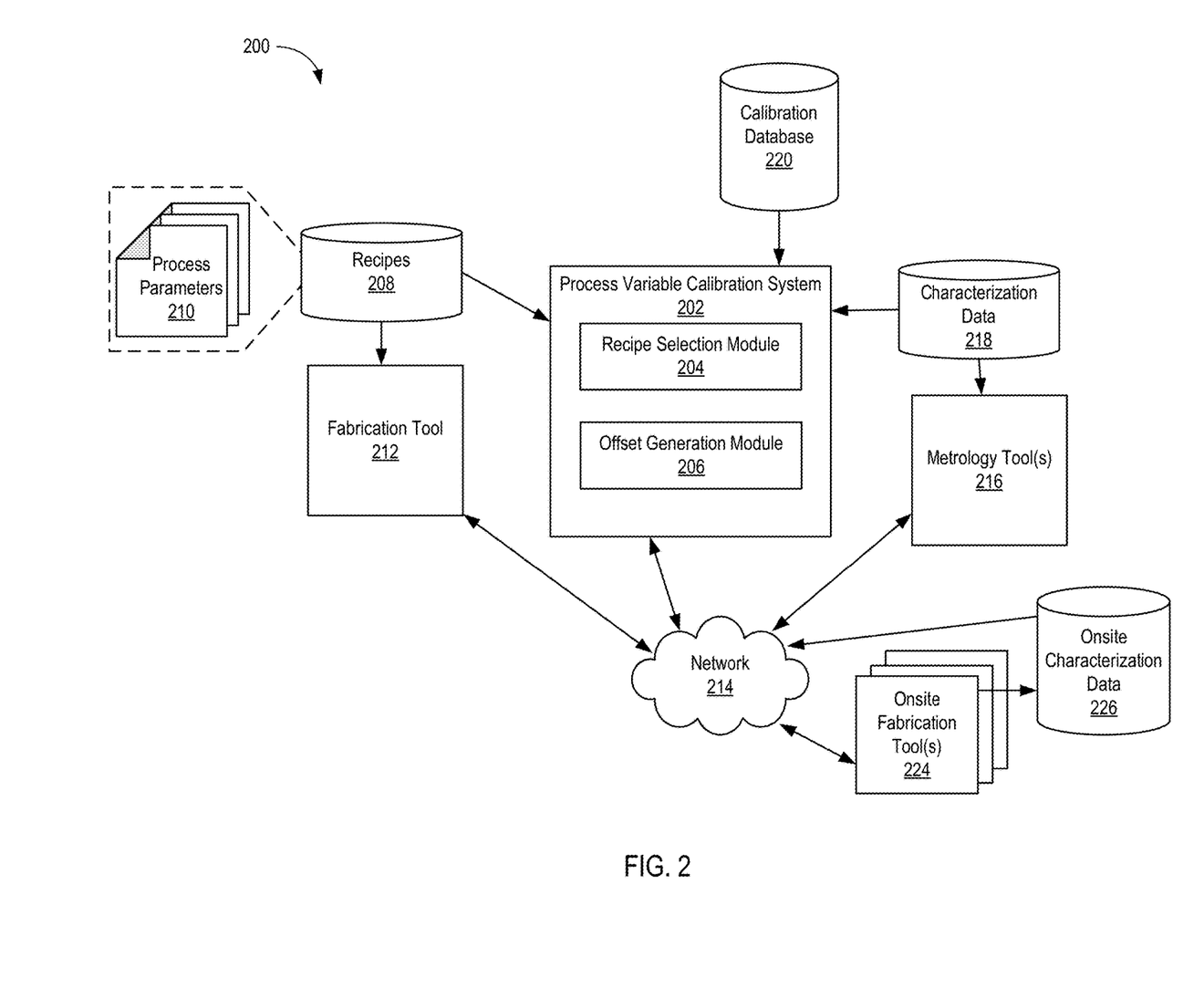
FIG. 2 shows a block diagram of an example operating environment for a process variable calibration system.

FIG. 2 shows an example operating environment 200 for a process variable calibration system 202. Process variable calibration system 202 includes a recipe selection module 204 and an offset generation module 206. Process variable calibration system 202 can receive multiple recipes 208 including respective process parameters 210 for performing fabrication processes on a fabrication tool 212. Fabrication tool 212 can be a standardized system, e.g., a "gold standard" system, (or an averaged set of standardized systems), to which other fabrication tools 212 of a same model or family of models can be calibrated against. A different standardized system(s) can be used for respective differentiating hardware configurations, e.g., different hardware subsystems. For example, a dielectric etch system can have a different standardized system(s) than a conductor etch system.

Process variable calibration system 202 is in data communication with fabrication tool 212 through network 214, for example, a local area network (LAN) or wide area network (WAN), e.g., the Internet. One or more operations described with reference to process variable calibration system 202 can be performed by one or more servers, e.g., local servers and/or cloud-based servers. For example, process variable calibration system can be hosted entirely on cloud-based server(s).

Process variable calibration system 202 is in data communication with one or more metrology tool(s) 216 through network 214. Metrology tool(s) 216 can be used to characterize substrates processed by fabrication tool 212 before, during, and/or after a fabrication process performed on the substrates using recipes 208. At times, metrology tool(s) can be sub-systems of fabrication tool 212, e.g., a metrology chamber of the fabrication tool 212. Metrology tool(s) can be ex situ to a processing chamber of the fabrication tool (e.g., processing chamber 100) include, for example, interferometry-based metrology tools or other thin-film measurement tool(s). Metrology tool(s) can include in situ metrology tools. In some embodiments, in situ metrology tool(s) can be located in a metrology chamber (e.g., an auxiliary chamber) that is connected to the processing chamber, e.g., by a transfer chamber or load lock. In some embodiments, in situ metrology tools can be located within a processing chamber of the fabrication tool, for example, temperature sensors (e.g., thermocouples, optical temperature sensors, resistive-based temperature sensors, etalon interferometers, etc.) In some embodiments, metrology tool(s) can be separate systems from fabrication tool 212, e.g., located externally to the fabrication tool. Metrology tool(s) 216 can be operable to generate characterization data 218 for one or more substrates.

Figure 5:
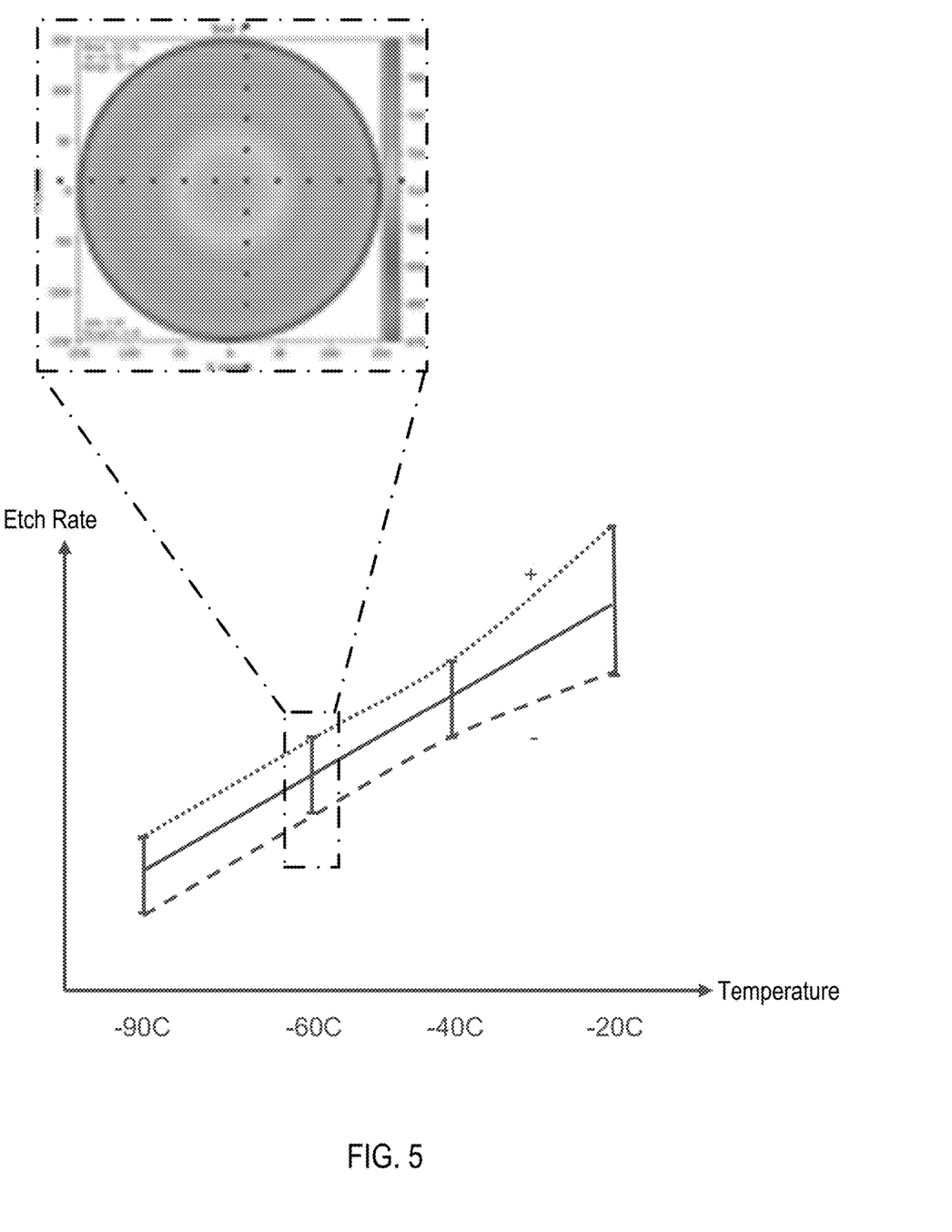
FIG. 5 shows an example plot of a process relationship.

In some embodiments, characterization data 218 includes measurements of a dimension of the substrate. For example, a thickness of one or more thin films formed on the wafer and/or a thickness of the wafer. Characterization data 218 can include a measurement of a dimension of the substrate before and after a fabrication process performed by the fabrication tool on the substrate using a recipe. For example, a measurement of the thickness of the substrate (e.g., including one or more layers) before and after an etch process. At times, characterization data 218 can include a wafer map including multiple measurement points across the substrate, e.g., as depicted in FIG. 5. Characterization data 218 can include a central tendency of multiple measurements of the dimension of the substrate (e.g., average, mean, median, etc.). Characterization data 218 can include a measurement of the dimension of the substrate at a central point of the substrate (e.g., aligned with the center axis perpendicular to a surface of the substrate).

Recipe selection module 204 of the process variable calibration system 202 can access characterization data 218 generated for substrates processed by fabrication tool 212 according to recipes 208 using process parameters 210 and generate a calibration procedure including selecting, from the recipes 208, a calibration recipe for calibrating a fabrication tool. Further details for selection of calibration recipes are described with reference to FIG. 4. Process variable calibration system 202 can store calibration procedures including calibration recipes in calibration database 220.

Process variable calibration system 202 can provide through network 214, to one or more onsite fabrication tools 224, a calibration procedure from the calibration database 220 including a calibration recipe for performing a calibration procedure. As used here, onsite fabrication tool 224 refers to a fabrication tool having a same model or within a same family of fabrication tool 212, and that is being prepared for deployment or deployed into a production environment.

In some embodiments, process variable calibration system 202 can receive onsite characterization data 226, e.g., through network 214. The onsite characterization data 226 includes characterization data collected from substrates processed on onsite fabrication tool(s) 224 using calibration recipe(s) from the calibration database 220. The onsite fabrication tool(s) 224 can generate a set of substrates using a calibration recipe, each substrate processed at a different process parameter value (e.g., at a different temperature value), per the calibration procedure. The set of substrates may be characterized, e.g., by metrology tools 216, and the onsite characterization data 226 is provided as input to the offset generation module 206. The offset generation module 206 determines, in response to the onsite characterization data 226, whether an offset for the onsite fabrication tool is required (e.g., and provides an offset in the instance in which it is required), as described in further detail with reference to FIG. 5.

Although described with reference to FIG. 2 as operations performed by a process variable calibration system 202, in some embodiments, some or all the onsite calibration methods described can be performed on a local version of the process variable calibration system 202 and/or by an offset generation program operating as a part of a local controller (e.g., controller 165) on the onsite fabrication tool 224.

In some embodiments, the system can generate a calibration procedure including selecting a calibration recipe from multiple available recipes, where a second process parameter (e.g., etch rate) exhibits a high degree of sensitivity (e.g., 2-3×, 5-10×, or greater) on a first process parameter (e.g., temperature) over one or more other process parameters for a fabrication process performed using the recipe. For example, a calibration recipe for a low temperature process can include a high degree of sensitivity of the etch process to process temperature over other process parameters, e.g., plasma power, backside gas cooling pressure, chamber pressure, etc.

Figure 3:
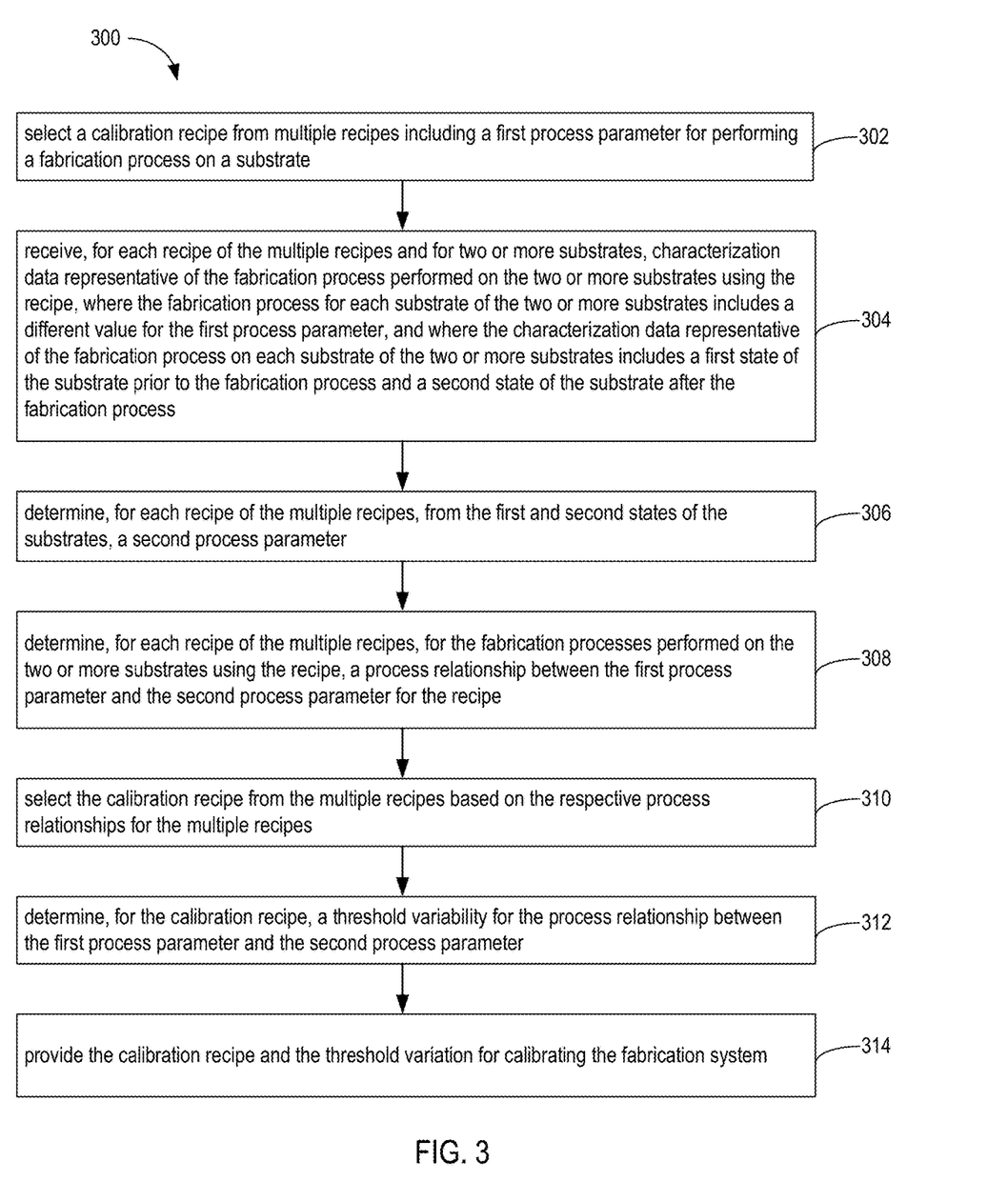
FIG. 3 shows a flow diagram of an example process of the process variable calibration system.

FIG. 3 is a flow diagram of an example process 300 for fabrication tool calibration. For convenience, the process 300 will be described as being performed by a system of one or more computers, located in one or more locations, and programmed appropriately in accordance with this specification. For example, a process variable calibration system, e.g., the process variable calibration system 202 of FIG. 2, appropriately programmed, can perform the process 300.

The process variable calibration system selects a calibration recipe from multiple recipes including a first process parameter for performing a fabrication process on a substrate (302). The multiple recipes, e.g., recipes 208, can be directed toward different types of fabrication processes, e.g., dielectric etch processes, conductor etch processes, etc., where the fabrication process may be specific to material of the substrate. Each of the recipes can include a set of process parameters, e.g., process parameters 210, including, for example, process temperature, backside gas pressure, plasma bias power, ion density, pressure in the process chamber, source power, etc. The process parameters may be tunable (e.g., selectable within a range) with respect to the recipe. At times, one of the process parameters may be selectable such that multiple fabrication processes can be performed using the recipe on multiple substrates where each substrate is processed using a different value for the process parameter. For example, process temperature can be selected from a range of process temperatures (e.g., −90 to −20 degrees Celsius, e.g., −150 to −90 degrees Celsius) where each substrate is processed using a different process temperature.

In some embodiments, a recipe may have multiple ranges of a process parameter that can be selectable. For example, process temperature for a recipe can be selectable from two or more ranges of process temperatures, e.g., −90 to −50 degrees Celsius and −60 to −20 degrees Celsius or −150 to −90 degrees Celsius and −90 to −20 degrees Celsius, where each substrate can be processed using a different process temperature within the respective range. At times, an etch rate of a substrate for a recipe may have increased sensitivity to process temperatures for a first range of process temperatures when compared to second range of process temperature for the same recipe. As described in further detail below, selecting a range of temperatures for which the etch rate has increased sensitivity can be advantageous for a calibration procedure to calibrate process temperatures.

In some embodiments, a design of experiments (DOE), or another experiment-based or simulation-based design scheme can be used to determine, from a set of recipes, a given recipe for which a second process parameter exhibits a threshold dependence (e.g., sensitivity) on a first process parameter over one or more other process parameters. For example, simulations can be used to screen sensitive process parameters (e.g., plasma parameters) to generate a DOE. Moreover, a DOE can be used to determine, for the given recipe, a range of values for the first process parameter for which the second process parameter exhibits a threshold degree of sensitivity to the first process parameter versus one or more other process parameters. For example, a recipe and a set of values for the process temperature can be determined where the etch rate of the substrate exhibits a threshold degree of sensitivity on temperature and where a respective sensitivity of etch rate on other process parameters (e.g., plasma power, backside gas pressure, ion density, etc.) is less than a threshold degree of sensitivity, e.g., an order of magnitude less. In other words, a DOE can be used to select a recipe and a range of values for the first process parameter (e.g., temperature) where a sensitivity of the second process parameter (e.g., etch rate) to other process parameter variability is suppressed.

Fabrication processes can be performed, e.g., using a standardized fabrication tool, for each recipe of the multiple recipes. The fabrication processes can be performed on multiple substrates, e.g., two or more substrates, where each substrate is processed using the recipe and a different value for a given process parameter, while maintaining other process parameters nominally fixed. For example, a set of two or more substrates (e.g., three or more, four or more substrates) can be etched in the plasma etch tool (e.g., as described in FIG. 1) using the recipe and at different substrate process temperatures.

For each recipe of the multiple recipes, the system receives characterization data representative of the fabrication processes performed on two or more substrates using the recipe (304). The fabrication process for each substrate or the two or more substrates includes a different value for the first process parameter, where the characterization data representative of the fabrication process on each substrate of the two or more substrates includes a first state of the substrate prior to the fabrication process and a second state of the substrate after the fabrication process. For example, the fabrication process can be an etch process. Characterization data can include, for example, measurements of a dimension (e.g., thickness) of the substrate. For example, characterization data can be measured thickness of thin film(s) formed on the substrate. The characterization data can include measurements of the dimension before and after the fabrication process, e.g., before and after an etch process is performed on the substrate.

In some embodiments, characterization data includes a central tendency (e.g., mean, median, mode, etc.) of a measured dimension of the substrate over multiple points of the substrate. For example, multiple measurements of a dimension of the substrate can be collected using a metrology tool 216 before an etch process and after the etch process is performed using the recipe. In some embodiments, characterization data includes a measurement of a central point of the substrate. For example, a dimension of a central (e.g., aligned along a central axis) point of the substrate can be collected using metrology tool 216 before and after the fabrication process.

For each recipe of the multiple recipes, the system determines a second process parameter from the first and second states of the substrates (306). For example, a difference between the measured dimensions in a first state and in a second state, e.g., before and after the etch process, can be used to calculate a thickness of an etched amount of the substrate. The second process parameter, e.g., an etch rate, can be extracted using the thickness of the etched amount of the substrate and a time of the etch process (e.g., from the recipe used to perform the fabrication process). For example, an etch rate can be determined as $$\text{Etch Rate} = \frac{D_2 - D_1}{\text{time}} \quad (1)$$

where D1 and D2 are the measured dimensions before and after the etch process, respectively.

The system determines, for each recipe of the multiple recipes and for the fabrication processes performed on the two or more substrates using the recipe, a process relationship between the first process parameter and the second process parameter for the recipe (308). To determine the process relationship between the first and second process parameters, the system can generate a respective plot of the first and second process parameters for the two or more substrates processed using the recipe and at different values of the first process parameter. As depicted in FIG. 5, calibration data is collected for each processed substrate of the two or more substrates using the recipe and for multiple values of the first process parameter. The etch rates for each substrate is calculated using equation (1), where a range of etch rates corresponding to a non-uniformity of the etch rates across the substrate surface is represented in FIG. 5 as a deviation from a central tendency of the etch rate (e.g., average etch rate). The system can determine a process relationship, e.g., a linear fit, from the points of the plot corresponding to average etch rate versus process temperature. A slope of the linear fit of the data can then be used to determine a sensitivity of the second process parameter (e.g., etch rate) on the first process parameter (e.g., temperature). For example, a shallower slope can indicate a less sensitive relationship and a steeper slope can indicate a more sensitive relationship of the second process parameter (e.g., etch rate) on the first process parameter (e.g., process temperature).

Referring to FIG. 3, the system selects the calibration recipe from the multiple recipes based on the respective process relationships for the multiple recipes (310). The system can, for each recipe of the multiple recipes, generate a respective plot and determine a process relationship between the second process parameter on the first process parameter for the recipe. By comparing the slopes of the generated plots each corresponding to a respective recipe, the system can select a calibration recipe from the multiple recipes having a threshold dependence of the second process parameter on the first process parameter (e.g., for a given substrate material composition). As noted above, for each recipe, the system can perform a DOE to establish a sensitivity regime, where the second process parameter has at least a threshold degree of sensitivity to the first process parameter.

The system determines, for the calibration recipe, a threshold variability for the process relationship between the first process parameter and the second process parameter (312). The system can determine a variability, e.g., a root mean square (RMS), of each variable sensitivity for the fabrication process performed using the calibration recipe. The variable sensitivity can include expected variability in the process parameters, e.g., pressure control, plasma power, chamber gas pressure, ion density, etc., as well as an expected wafer-to-wafer inherent variability (e.g., as provided by the wafer manufacturer). A threshold variability, e.g., representing a total chamber-to-chamber variability, is determined by combining (such as by adding) all the individual subsystem variabilities and the inherent wafer-to-wafer variation. Individual subsystem variabilities can be determined through analysis of hardware performance (e.g., performance logs, self-inspection, test procedures, etc.) Wafer-to-wafer variation can be determined through metrology measurements, e.g., in-line metrology including ellipsometry, CD-SEM, etc. The threshold variability can include, for example, a standard deviation from a nominal RMS variability. The threshold variability can include, for example, a percentage variance from a nominal RMS variability. In some embodiments, the determined threshold variability can be stored with the corresponding calibration recipe and the calibration procedure in the calibration database 220.

The system provides the calibration recipe and the threshold variability for calibrating the fabrication system (314). In some embodiments, a fabrication system is calibrated using a calibration recipe. Calibration of a fabrication system can be performed, for example, during an initial installation and qualification process for an onsite fabrication system. In some embodiments, a fabrication system can be re-calibrated using the calibration recipe. For example, the fabrication system can be re-calibrated in response to an observed drift in the fabrication process from an expected outcome, e.g., etch rate non-uniformity between process chambers. In another example, the fabrication system can be re-calibrated in response to a change in the configuration of the fabrication system, e.g., a component is replaced or reconfigured. In some embodiments, a fabrication system can be re-calibrated periodically, e.g., for quality control purposes.

The process variable calibration system can provide to an onsite fabrication tool, e.g., onsite fabrication tool 224, a calibration procedure including a calibration recipe selected based on one or more process parameters of the fabrication tool. For example, a calibration procedure including a calibration recipe can be selected based on an etch chemistry, a substrate composition, process temperature, or another process parameter.

Figure 4:
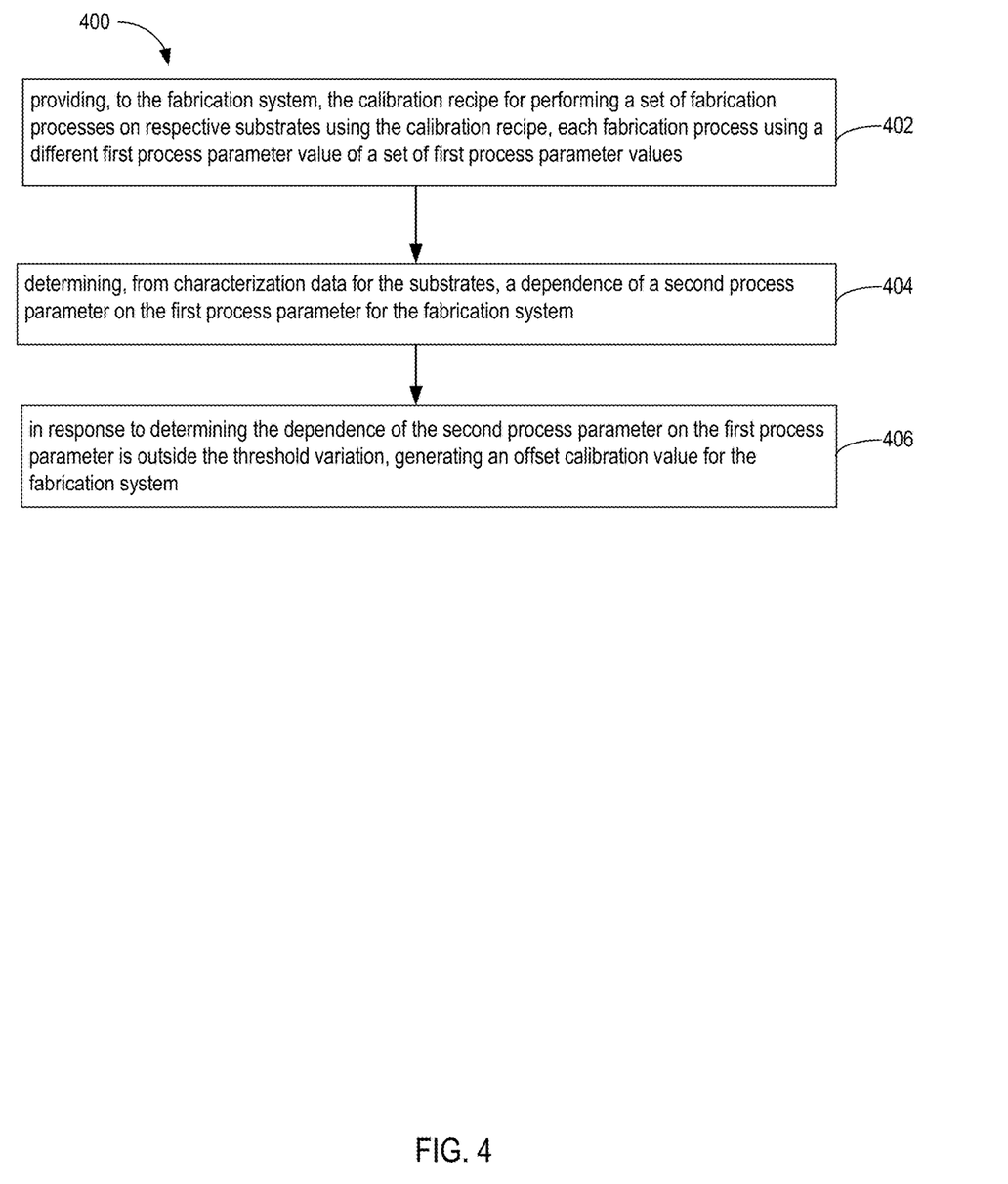
FIG. 4 shows a flow diagram of another example process of the process variable calibration system.

FIG. 4 is a flow diagram of another example process 400 for calibrating a fabrication tool using a calibration procedure. For convenience, the process 400 will be described as being performed by a system of one or more computers, located in one or more locations, and programmed appropriately in accordance with this specification.

The system provides a calibration recipe to a fabrication tool for performing a set of fabrication processes on respective substrates using a calibration recipe, where each fabrication process uses a different first process parameter value of a set of first process parameter values (402). The calibration recipe can be provided by the system with calibration procedures, e.g., instructions for implementing the calibration recipe to generate calibration data. For example, process variable calibration system 202 can receive a request from an onsite fabrication tool 224 (e.g., from a technician or end-operator of the tool) for calibration procedures to calibrate the onsite fabrication tool. The process variable calibration system 202 can select a calibration recipe from the calibration data 220 to provide to the onsite fabrication tool 224 and including calibration procedures for performing a set of fabrication processes using the calibration recipe. For example, the set of fabrication processes can include performing fabrication processes on two or more substrates, each substrate processes at a different process temperature within a range of temperatures. The calibration procedures can further include collecting onsite calibration data for the processed substrates, e.g., using metrology tools as described in this specification.

The system determines, from characterization data for the substrates, a dependence of a second process parameter on the first process parameter for the fabrication system (404). In some embodiments, the onsite fabrication tool 224 can provide onsite characterization data 226 for the processes substrates over network 214 to the process variable calibration system 202. An offset generation module 206 can determine a process relationship of the second process parameter on the first process parameter. For example, the process relationship can be a linear relationship between etch rates and process temperatures, where each processed substrate corresponds to a point on a process relationship plot, e.g., as described with reference to FIG. 5. The system can generate a plot of the etch rates versus process temperatures for the calibration recipe and determine the process relationship. The system can determine a variability of the process relationship of the first process parameter on the second process parameter from the linear relationship for onsite fabrication tool.

The system generates an offset calibration value for the fabrication system in response to determining the dependence of the second process parameter on the first process parameter is outside a threshold variation (406). The system can generate a calibration curve for the calibration recipe on a standardized chamber(s) and a mean etch rate and etch rate sensitivity to the ESC temperature is determined. For a given onsite fabrication tool, the system can receive calibration data for the same calibration recipe and compare a difference in etch rates between the onsite fabrication tool and the standardized fabrication tool(s). In other words, the system can compare the variability of the process relationship of the first process parameter on the second process parameter for the set of processed substrates by the onsite fabrication tool 224 to a threshold variability for a standard fabrication tool (e.g., a "golden standard" tool) for the calibration recipe. If the system determines that the variability for the process relationship is outside the threshold variability, the system can generate an offset for the onsite fabrication tool.

In some embodiments, the system calculates an offset calibration value by dividing the etch rate difference (e.g., an averaged etch rate difference for the multiple temperature points) between the onsite fabrication tool and the standardized fabrication tool by the determined temperature sensitivity for the calibration recipe.

In some embodiments, the offset calibration value can be determined based on the determined variability for the onsite fabrication tool with respect to the threshold variability of the standard fabrication tool for the calibration recipe. For example, a threshold variability of the standard fabrication tool for the calibration recipe can be set as X+/−Y. For a variability value Z of the onsite fabrication tool that outside the variability range, e.g., where Z is outside a range Z>X+Y or Z<−X−Y, the offset calibration value A can be set as:

$$\text{For } Z > X + Y, A = Z - Y$$
$$\text{For } Z < X - Y, A = Y - Z$$

Where Z and Y as described here can be absolute values or percentage values of a nominal variability.

In some embodiments, the offset calibration value can be a global offset applied to a control system for one or more process parameters. A global temperature offset can be applied to a temperature control system for a process temperature, e.g., as a set point change to a process control loop. For example, an offset can be applied as setpoint offset(s) in a PID loop of a PID controller for a process temperature control system. In another example, an offset calibration value can be used to offset a reading of temperature probe(s) that measure a process temperature (e.g., backside substrate temperature) to temperature process controller(s).

In some embodiments, calibration recipes can be selected, e.g., using the methods described above, to calibrate different heating zones of an electrostatic chuck (ESC). For example, a recipe can be selected to perform a zone-by-zone calibration, where characterization data is collected for each zone for a substrate in a first state (before) and a second state (after) during a fabrication process. Moreover, the methods described herein can be used to facilitate microzone tuning and/or extreme edge quantification for a substrate, where additional calibration data can be collected that is representative of the etch process at each of the microzone heaters and/or edges of the substrate for a recipe. A combined etch rate offset map and an etch rate map of the substrate can be compared to a golden etch rate uniformity map for a substrate can be used to adjust microzone heaters. For example, to scale the offset for the microzone heaters using the overlay of the two calibrations and to determine what other variables might have high influence, e.g., due to the electrostatic chuck support structure locations, support structure types, centering with respect to the substrate, etc.

In some embodiments, real-time in situ temperature measurements, e.g., using an interferometric etalon, can be combined with an etch rate signal to build a combined model of the etch rate versus temperature. The combined model can be used to generate a real-time wafer temperature map and may be used to adjust, in real-time, process parameters during the fabrication process. For example, the real-time wafer temperature map can be used in a control loop, e.g., a closed loop feedforward control, to adjust setpoints of various components during a fabrication process. An in situ metrology tool, e.g., an interferometer, can be used to collect a higher density of data points and build a denser temperature map across a surface of the substrate. The real-time measurements can be used to build an algorithm to automatically update the offsets, e.g., between processing substrates. Real-time measurements can be used to catch drift in the fabrication tool between processing runs, to more quickly implement offsets and reduce chamber-to-chamber variability (e.g., between fabrication tools or between chambers of a fabrication tool).

Figure 6:
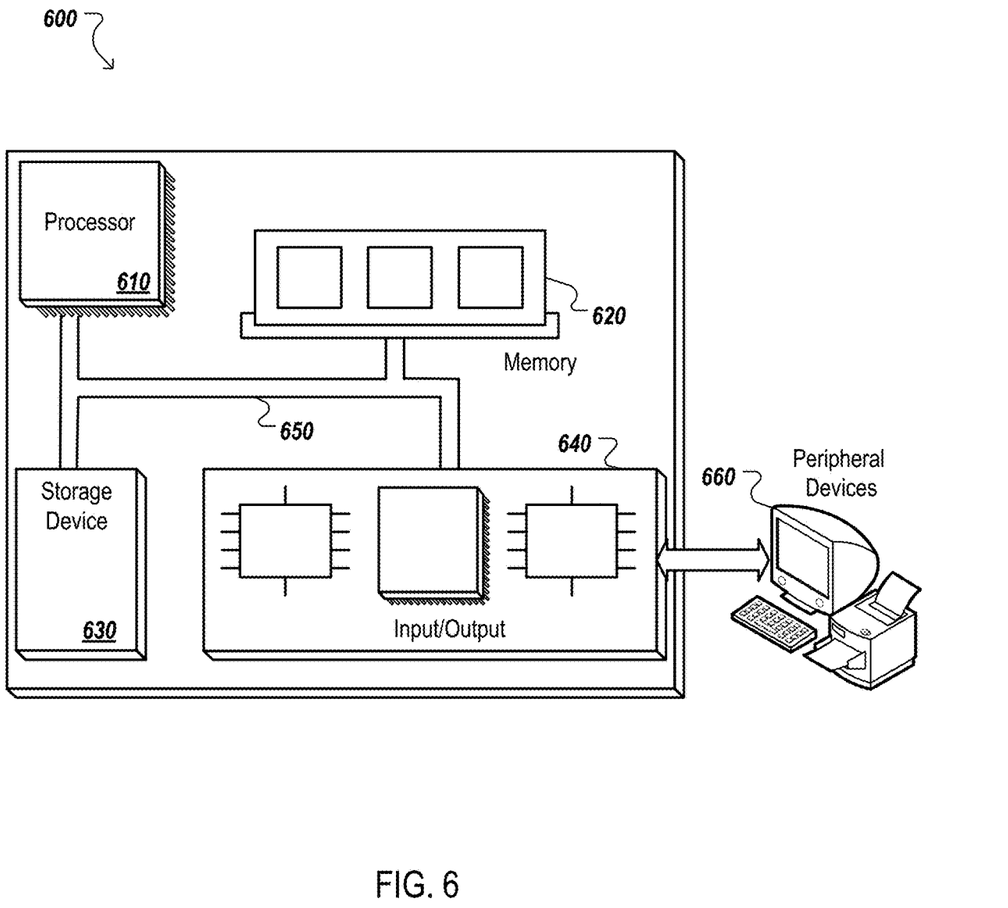
FIG. 6 shows a generic computer system.

FIG. 6 is block diagram of an example computer system 600 that can be used to perform operations described above. For example, such as operations performed by the electrostatic chuck model. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., an RS-232 port, and/or a wireless interface device, e.g., and 802.11 card. In another implementation, the input/output device can include driver devices configured to receive input data and send output data to peripheral devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Aspects of the subject matter and the actions and operations described in this specification, for example, computing devices such as controller 165 and processes performed by controller 165 such as controlling switching of etching gasses of a plasma processing chamber, can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively, or in addition, the carrier can be an artificially-generated propagated signal, e.g., a machine-generated electrical, optical, or electromagnetic signal, which is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment can include one or more computers interconnected by a data communication network in one or more locations.

A computer program can, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, and any other kind of central processing unit. Generally, a central processing unit will receive instructions and data from a read-only memory or a random-access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid-state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claim can be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method for calibrating a fabrication system comprising:
    selecting, from a plurality of recipes, a calibration recipe including a first process parameter for performing a fabrication process on a substrate, wherein the selecting comprises:
        for each recipe of the plurality of recipes:
            receiving, for two or more substrates, characterization data representative of the fabrication process performed on the two or more substrates using the recipe, wherein the fabrication process for each substrate of the two or more substrates includes a different value for the first process parameter, and wherein the characterization data representative of the fabrication process on each substrate of the two or more substrates comprises a first state of the substrate prior to the fabrication process and a second state of the substrate after the fabrication process;
            determining, from the first and second states of the substrates, a second process parameter; and
            determining, for the fabrication processes performed on the two or more substrates using the recipe, a process relationship between the first process parameter and the second process parameter for the recipe; and
        selecting the calibration recipe from the plurality of recipes based on the respective process relationships for the plurality of recipes;
    determining, for the calibration recipe, a threshold variation for the process relationship between the first process parameter and the second process parameter; and
    providing the calibration recipe and the threshold variation for calibrating the fabrication system.

2. The method of claim 1, wherein the first process parameter comprises a substrate temperature of the substrate during the fabrication process.

3. The method of claim 1, wherein the second process parameter comprises an etch rate of the substrate during the fabrication process.

4. The method of claim 1, wherein determining the process relationship comprises extracting a slope of a linear relationship between the first process parameter and the second process parameter for the fabrication process performed on the two or more substrates.

5. The method of claim 1, wherein selecting the calibration recipe from the plurality of recipes comprises selecting a recipe of the plurality of recipes having at least a threshold dependence between the first process parameter and the second process parameter.

6. The method of claim 5, wherein selecting the calibration recipe from the plurality of recipes comprises selecting a recipe from the plurality of recipes having the largest dependence on the first process parameter for the second process parameter.

7. The method of claim 6, wherein selecting the calibration recipe from the plurality of recipes comprises selecting a recipe of the plurality of recipes having the largest dependence on substrate temperature for etch rate of the substrate.

8. The method of claim 1, wherein the calibration recipe further comprises a plurality of process parameters, and wherein selecting the calibration recipe from the plurality of recipes comprises selecting a recipe of the plurality of recipes having a dependence on the first process parameter for the second process parameter greater by a specified threshold amount than a determined dependence on each other process parameter of the plurality of process parameters on the second process parameter.

9. The method of claim 1, wherein providing the calibration recipe and the threshold variation for calibrating the fabrication system comprises:
    providing, to the fabrication system, the calibration recipe for performing a set of fabrication processes on respective substrates using the calibration recipe, each fabrication process using a different first process parameter value of a set of first process parameter values;
    determining, from characterization data for the substrates, a dependence of the second process parameter on the first process parameter for the fabrication system; and
    in response to determining the dependence of the second process parameter on the first process parameter is outside the threshold variation, generating an offset calibration value for the fabrication system.

10. The method of claim 1, wherein receiving, for two or more substrates, the characterization data representative of the fabrication process performed on the two or more substrates using the recipe comprises:
  performing, on the two or more substrates, the fabrication process using the recipe, wherein the fabrication process for each substrate of the two or more substrates includes a different value for the first process parameter; and
  characterizing the two or more substrates to extract the characterization data.

11. The method of claim 10, wherein the fabrication process comprises an etch process.

12. A system comprising:
  one or more computers and one or more storage devices on which are stored instructions that are operable, when executed by the one or more computers, to cause the one or more computer to perform operations comprising:
    selecting, from a plurality of recipes, a calibration recipe including a first process parameter for performing a fabrication process on a substrate, wherein the selecting comprises:
      for each recipe of the plurality of recipes:
        receiving, for two or more substrates, characterization data representative of the fabrication process performed on the two or more substrates using the recipe, wherein the fabrication process for each substrate of the two or more substrates includes a different value for the first process parameter, and wherein the characterization data representative of the fabrication process on each substrate of the two or more substrates comprises a first state of the substrate prior to the fabrication process and a second state of the substrate after the fabrication process;
        determining, from the first and second states of the substrates, a second process parameter; and
        determining, for the fabrication processes performed on the two or more substrates using the recipe, a process relationship between the first process parameter and the second process parameter for the recipe; and
      selecting the calibration recipe from the plurality of recipes based on the respective process relationships for the plurality of recipes;
    determining, for the calibration recipe, a threshold variation for the process relationship between the first process parameter and the second process parameter; and
    providing the calibration recipe and the threshold variation for calibrating the fabrication system.

13. One or more non-transitory computer storage media encoded with computer program instructions that when executed by one or more computers cause the one or more computers to perform operations comprising:
  selecting, from a plurality of recipes, a calibration recipe including a first process parameter for performing a fabrication process on a substrate, wherein the selecting comprises:
    for each recipe of the plurality of recipes:
      receiving, for two or more substrates, characterization data representative of the fabrication process performed on the two or more substrates using the recipe, wherein the fabrication process for each substrate of the two or more substrates includes a different value for the first process parameter, and wherein the characterization data representative of the fabrication process on each substrate of the two or more substrates comprises a first state of the substrate prior to the fabrication process and a second state of the substrate after the fabrication process;
      determining, from the first and second states of the substrates, a second process parameter; and
      determining, for the fabrication processes performed on the two or more substrates using the recipe, a process relationship between the first process parameter and the second process parameter for the recipe; and
    selecting the calibration recipe from the plurality of recipes based on the respective process relationships for the plurality of recipes;
  determining, for the calibration recipe, a threshold variation for the process relationship between the first process parameter and the second process parameter, and
  providing the calibration recipe and the threshold variation for calibrating the fabrication system.

* * * * *